US006818697B2

(12) United States Patent
Zhang et al.

(10) Patent No.: US 6,818,697 B2
(45) Date of Patent: Nov. 16, 2004

(54) COATING COMPOSITION

(75) Inventors: Wei Zhang, Maple Glen, PA (US); Ozzie Moore Pressley, Cheltenham, PA (US)

(73) Assignee: Rohm and Haas Company, Philadelphia, PA (US)

( * ) Notice: Subject to any disclaimer, the term of this patent is extended or adjusted under 35 U.S.C. 154(b) by 59 days.

(21) Appl. No.: 10/262,143

(22) Filed: Oct. 1, 2002

(65) Prior Publication Data

US 2003/0073778 A1 Apr. 17, 2003

Related U.S. Application Data

(60) Provisional application No. 60/326,349, filed on Oct. 1, 2001.

(51) Int. Cl.$^7$ .............................................. C08F 216/04
(52) U.S. Cl. ...................... 524/560; 524/609; 524/817; 524/515; 524/431; 524/523; 523/201; 523/220; 523/247; 523/287
(58) Field of Search ................ 524/523, 431, 524/515, 560, 609, 817; 523/201, 220, 277, 287

(56) References Cited

U.S. PATENT DOCUMENTS

| | | |
|---|---|---|
| 3,449,303 A | 6/1969 | Caldwell et al. |
| 4,110,285 A | 8/1978 | Pons et al. |
| 4,130,523 A | 12/1978 | Hoy et al. |
| 4,247,438 A | 1/1981 | Eck et al. |
| 4,254,004 A | 3/1981 | Abbey |
| 4,433,124 A | 2/1984 | Okamoto et al. |
| 4,456,726 A | 6/1984 | Siol et al. |
| 4,506,057 A | 3/1985 | Greene et al. |
| 4,657,966 A | 4/1987 | Mallya |
| 4,780,503 A | 10/1988 | Mallya |
| 4,812,510 A | 3/1989 | Barnett et al. |
| 5,344,675 A * | 9/1994 | Snyder .................... 427/388.4 |
| 5,430,092 A | 7/1995 | Aydin et al. |
| 5,498,655 A | 3/1996 | Aydin et al. |
| 5,541,253 A | 7/1996 | Dunaway et al. |
| 5,726,259 A | 3/1998 | Hayes et al. |
| 5,744,544 A | 4/1998 | Dunaway et al. |
| 5,922,410 A | 7/1999 | Swartz et al. |
| 5,990,221 A | 11/1999 | Dames et al. |
| 6,040,380 A | 3/2000 | Dunaway et al. |
| 6,258,888 B1 * | 7/2001 | Peters et al. ................ 524/522 |
| 6,485,786 B2 | 11/2002 | Deng et al. |
| 2002/0058749 A1 | 5/2002 | Larson et al. |

FOREIGN PATENT DOCUMENTS

| | | |
|---|---|---|
| EP | 0221498 | 5/1987 |
| EP | 0 614922 B1 | 9/1994 |
| EP | 0376591 B1 | 2/1995 |
| EP | 0960889 | 12/1999 |
| GB | 958856 | 6/1962 |
| JP | 61-143411 | 7/1986 |
| JP | 2000-204294 | 7/2000 |
| WO | WO 00/55223 | 9/2000 |
| WO | WO 00/55224 | 9/2000 |
| WO | WO01/10918 | 2/2001 |

* cited by examiner

Primary Examiner—David W. Wu
Assistant Examiner—Satya Sastri
(74) Attorney, Agent, or Firm—Chipo M. Joliboi

(57) ABSTRACT

An improved aqueous coating composition which includes a bimodal copolymer. Methods of using an aqueous coating composition which includes a bimodal copolymer.

10 Claims, No Drawings

COATING COMPOSITION

CROSS REFERENCE TO RELATED PATENT APPLICATIONS

This is a non-provisional application of prior pending U.S. provisional application serial No. 60/326,349 filed Oct. 1, 2001.

The present invention relates to an aqueous coating composition which includes a bimodal copolymer, and which provides an improvement in at least one of the following properties: stain blocking, block resistance, hiding, and shear stability.

Coating compositions are routinely applied to the surfaces of substrates, including the surfaces of previously coated substrates. Substrates frequently contain water soluble staining agents. When a water based coating is applied to the substrate, these staining agents often leach from the substrate into the coating, causing discoloration of the coating. For example, tennins contained in woods such as redwood, cedar, elm, and mahogany can leach from the substrate into the coating, causing tannin staining, which appears as discoloration on the surface of the coating; and salts contained in cementitious substrates often cause efflorescence, which is a staining caused by the migration of the salt from the substrate to the paint coating, where it appears as white deposits. Staining of the substrate, and of coatings previously applied to the substrate, can also be caused by sources external to the substrate. For example, cigarette smoke causes nicotine staining, which discolors light colored coatings; and inks from pens cause marker stains on the substrate. Each of the abovementioned typos of staining is highly undesirable in coatings. Attempts have been made to resolve this problem by incorporating strong acids into a polymer backbone. While the addition of strong acid can achieve the reduction, or elimination of stain bleeding, stain blocking generally requires the use of emulsion polymers having a small particle size, which limits the solid content of the polymer emulsion used to make the coating composition. For performance reasons, such as shear stability, open time, and formulation latitude, it is desirable to have a high solids content in the coating composition. Therefore, there is a need for a coating composition which is capable of stain blocking, and contains a high solids content.

U.S. Pat. No. 4,812,510, discloses colloid-free vinyl acetate latexes which include up to 15 weight parts of an ionic comonomer such as sodium styrene sulfonate, sodium vinyl sulfonate, and mono- and di-phosphated hydroxyethyl methacrylate and which are prepared with up to 20 weight parts of certain anionic surfactants including phosphates and sulfonates, for use in a variety of adhesives and coatings. However the use of the latexes in stain-blocking coating compositions is not disclosed. Furthermore, the use of bimodal polymers is not disclosed.

U.S. Pat. No. 5,922,410 discloses a clear (unpigmented) wood coating composition which includes a copolymer containing from 0.1 to 50 wt. % of a copolymerizable monomer containing a conjugate base of an acid, the acid having a pKa of less than 4 for use in clear coatings to enhance the yellowness (warmth) of the wood to which it is applied. However the use of the copolymers in stain-blocking coating compositions is not disclosed. Furthermore, the use of bimodal polymers is not disclosed.

Applicants have discovered that a water-based coating composition that is useful as stain blocker, and has a high solids content, can be made by incorporating a strong acid into the polymer backbone of a bimodal emulsion copolymer, while maintaining, or improving the stain blocking performance of a unimodal stain blocking coating composition. Unexpectedly, applicants also found that coating compositions of the invention may have improvements over a unimodal coating composition in one or more of the following properties: stain blocking, block resistance and shear stability.

A first aspect of the present invention provides a coating composition comprising a bimodal aqueous emulsion copolymer, wherein said copolymer comprises as polymerized units from 0.1% to 10% by weight, based on the dry weight of said copolymer, of a compound selected from the group consisting of at least one strong acid monomer, and salts thereof; wherein said copolymer contains small mode particles having a diameter of from 50 to 150 nm; wherein said copolymer contains large mode particles having a diameter of less than 400 nm, and said large mode particles are larger in diameter than said small mode particles; and wherein the ratio of said small mode particles to said large mode particles is from 10:90 to 90:10 by weight.

A second aspect of the present invention provides a method for blocking stains on a substrate comprising: (a) forming a coating composition comprising a bimodal aqueous emulsion copolymer, wherein said copolymer comprises as polymerized units from 0.1% to 10% by weight, based on the dry weight of said copolymer, of a compound selected from the group consisting of at least one strong acid monomer, and salts thereof; wherein said copolymer contains small mode particles having a diameter of from 50 to 150 nm; wherein said copolymer contains large mode particles having a diameter of less than 400 nm, and said large mode particles are larger in diameter than said small mode particles; wherein the ratio of said small mode particles to said large mode particles is from 10:90 to 90:10; (b) applying said coating composition to a substrate bearing a stain; and (c) drying, or allowing to dry said coating composition.

A third aspect of the present invention provides a method for improved hiding comprising: (a) forming a coating composition comprising a bimodal aqueous emulsion copolymer, wherein said copolymer comprises as polymerized units from 0.1% to 10% by weight, based on the dry weight of said copolymer, of a compound selected from the group consisting of at least one strong acid monomer, and salts thereof; wherein said copolymer contains small mode particles having a diameter of from 50 to 150 nm; wherein said copolymer contains large mode particles having a diameter of less than 400 nm, and said large mode particles are larger in diameter than said small mode particles; wherein the ratio of said small mode particles to said large mode particles is from 10:90 to 90:10; (b) applying said coating composition to a substrate bearing a stain; and (c) drying, or allowing to dry said coating composition.

A fourth aspect of the present invention provides a method for improved block resistance comprising: (a) forming a coating composition comprising a bimodal aqueous emulsion copolymer, wherein said copolymer comprises as polymerized units from 0.1% to 10% by weight, based on the dry weight of said copolymer, of a compound selected from the group consisting of at least one strong acid monomer, and salts thereof; wherein said copolymer contains small mode particles having a diameter of from 50 to 150 nm; wherein said copolymer contains large mode particles having a diameter of less than 400 nm, and said large mode particles are larger in diameter than said small mode particles; wherein the ratio of said small mode particles to said large mode particles is from 10:90 to 90:10; (b) applying said coating composition to a substrate bearing a stain; and (c) drying, or allowing to dry said coating composition.

A fifth aspect of the present invention provides a method for improved shear stability comprising: forming a coating composition comprising a bimodal aqueous emulsion copolymer, wherein said copolymer comprises as polymerized units from 0.1% to 10% by weight, based on the dry weight of said copolymer, of a strong acid monomer, or salts thereof; wherein said copolymer contains small mode particles having a diameter of from 50 to 150 nm; wherein said copolymer contains large mode particles having a diameter of less than 400 nm, and said large mode particles are larger in diameter than said small mode particles; wherein the ratio of said small mode particles to said large mode particles is from 10:90 to 90:10.

The composition of this invention is a coating composition containing a bimodal aqueous emulsion copolymer whose polymerized units include from 0.1% to 10% by weight (based on the dry weight of the copolymer), preferably from 1% to 10%, more preferably from 1% to 6%, of a compound selected from the group consisting of at least one strong acid monomer, and salts thereof. The composition is particularly useful as a stain blocking coating. By "stain blocking coating", herein is meant a coating which, when dry, is intended to prevent the migration of stains from the substrate, or from coatings previously applied to the substrate, so that when dry, the composition of the invention, or an aqueous coating applied over the composition of the invention, will have an aesthetically pleasing appearance with minor visible, or no stains on its surface. Alternatively, one skilled in the art may refer to the stain blocking coating as a stain-blocking primer, or a stain locking primer. By "bimodal copolymer", herein is meant a copolymer having two populations of particle mode, wherein each of the two populations appears as a separate peak in a particle size distribution plot, due to the difference in diameter of each mode. By particle "diameter" herein is meant the diameter of the polymer particle as measured by a Matec Applied Sciences CHDF-2000 instrument. The small mode particles of the bimodal copolymer of the invention preferably have an average diameter of from 20 nm to 170 nm, more preferably from 50 nm to 150 nm, most preferably from 75 nm to 125 nm. The large mode particles of the bimodal copolymer of the invention preferably have a diameter of less than 400 nm, more preferably less than 300 nm, most preferably less than 250 nm. The large mode particles are larger in diameter than the small mode particles. Preferably, the ratio (by weight) of the small mode particles to the large mode particles is from 10:90 to 90:10, more preferably from 30:70 to 70:30, most preferably from 35:65 to 65:35. Preferably, the bimodal copolymer contains a high percentage of the small mode particles. By "high percentage", herein is meant that the small mode particles represent from 50% to 65% by weight of the copolymer. It is contemplated that in certain embodiments of the invention includes a multimodal emulsion polymer.

Applicants have found that the coating compositions of the invention have improvements over a unimodal coating composition in one or more of the following properties: stain blocking, block resistance and shear stability. It is contemplated that certain embodiments of the coating composition of the invention provide for paints which have improvements in one or more of the following properties: open time, stain resistance, oil softening resistance, organic solvent resistance, metal adhesion, and freeze/thaw resistance.

The polymerized units of the bimodal aqueous emulsion copolymer include from 0.1% to 10% by weight (based on the dry weight of the copolymer), preferably from 1% to 10%, more preferably 1% to 6%, of a strong acid monomer, or salt thereof.

By "strong acid monomer", herein is meant monomer bearing a pendant acid group having a pKa (in water at 20° C.) of less than 4, or a salt thereof. Suitable salts of strong acid monomers include, for example, ammonium, sodium, potassium and lithium salts. Examples of suitable strong acid monomers include 2-acrylamido-2-methylpropane sulfonic acid, vinyl sulfonic acid, styrene sulfonic acid, 1-allyloxy-2-hydroxypropane sulfonic acid, alkyl allyl sulfosuccinic acid, sulfoethyl (meth)acrylate, phosphoalkyl (meth)acrylates such as phosphoethyl (meth)acrylate, phosphopropyl (meth)acrylate, and phosphobutyl (meth)acrylate, phosphoalkyl crotonates, phosphoalkyl maleates, phosphoalkyl fumarates, phosphodialkyl (meth)acrylates, phosphodialkyl crotonates, and allyl phosphate, and combinations thereof. By "(meth)acrylate" herein is mean either an acrylate or a methacrylate. Preferably, the ethylenically unsaturated strong acid monomer is a Phosphorous-containing monomer, more preferably, phosphoethyl-methacrylate. Preferably, the ethylenically unsaturated strong acid contains 1% to 10%, more preferably 0.5% to 10%, most preferably 1% to 5% of the phosphorous containing monomer. It is contemplated that the copolymerized ethylenically unsaturated strong acid monomer may be formed after the polymerization of at least one ethylenically unsaturated monomer and a strong acid precursor monomer by effecting the reaction of the copolymerized strong acid precursor monomer so as to convert it to a copolymerized strong acid monomer; for example a polymer containing, as a polymerized unit, hydroxyethyl methacrylate which may then be reacted, as is well known in the art, to form, for example, sulfoethyl methacrylate or phosphoethyl methacrylate.

Certain embodiments of the bimodal copolymer contains from 0% to 5%, more preferably from 0% to 2%, most preferably 0% to 1% (by weight, based on the dry weight of the copolymer), copolymerized weak acid monomer, or salts thereof By "weak acid monomer", herein is meant monomer bearing a pendant acid group having a pKa (in water at 20° C.) of greater than 4, or a salt thereof. Examples of suitable weak acid monomers include, without limitation, acrylic acid, methacrylic acid, crotonic acid, itaconic acid, fumaric acid, maleic acid, monomethyl itaconate, monomethyl fumarate, monobutyl fumarate, maleic anhydride, and combinations thereof Suitable salts of weak acid monomers include, for example, ammonium, sodium, potassium and lithium salts.

Certain embodiments of the polymerized units of the bimodal aqueous emulsion copolymer include at least one ethylenically unsaturated monomer. Suitable ethylenically unsaturated monomers are selected from amides such as (meth)acrylamide, propenamide, dimethylacrylamide; esters such as methyl acrylate, ethyl acrylate, butyl acrylate, propyl acrylate, 2-ethylhexyl acrylate, hydroxyethyl acrylate, methyl methacrylate, hydroxyethyl methacrylate, hydroxymethyl acrylate, hydroxymethyl methacrylate, hydroxypropyl acrylate, hydroxypropyl methacrylate, vinyl acetate, vinyl proprionate, or other vinyl esters; nitriles such as acrylonitrile; and combinations of the foregoing. Other suitable ethylenically unsaturated monomers include vinyl monomers such as vinyl chloride, vinylidine chloride, vinyl toluene and N-vinyl pyrollidone; vinyl benzophenone; styrene or alkyl-substituted styrene; butadiene; and combinations of the foregoing.

In certain embodiments, one, or both modes of the bimodal copolymer contain from 0% to 5%, by weight based on the dry weight of the copolymer, copolymerized multi-ethylenically unsaturated monomers such as, for example, allyl methacrylate, diallyl phthalate, 1,3-butylene glycol dimethacrylate 1,4-butylene glycol dimethacrylate, 1,2-ethylene glycol dimethacrylate, 1,6-hexanediol diacrylate, and divinyl benzene.

It is contemplated that certain embodiments of the aqueous coating composition of the invention contain pigments and/or fillers such as, for example, titanium dioxide, iron oxide, zinc oxide, magnesium silicate, calcium carbonate, organic and inorganic colored pigments, and clay. Such pigmented coating compositions preferably contain from 0% to 85% pigment on a volume basis. Preferred for the method of blocking stains is from 0% to 50% pigment on a volume basis. For block resistance, where judicious selection of the pigment is important, pigments and/or fillers containing divalent or multivalent metal ions are preferred. Suitable multivalent ions include, for example, $Zn^{+2}$, $Ca^{+2}$, $Mg^{+2}$, $Cu^{+2}$, $Co^{+2}$, $Cr^{+2}$, $Fe^{+2}$, and $Zr^{+4}$. Preferred divalent ions are $Zn^{+2}$, $Ca^{+2}$, $Mg^{+2}$. It is also contemplated that certain embodiments of the aqueous coating composition of the invention contain opaque polymer particles, such as, for example, Ropaque™ Opaque Polymers (Rohm and Haas Co., Philadelphia Pa.), which are useful for further improving the dry hiding of paints formulated with the bimodal copolymer of this invention. In certain other embodiments, extender particles with low oil absorption values are added to the aqueous coating composition of the invention, such as, for example, Expancel™ 551 DE20 Acrylonitrile/Vinyl Chloride expanded particles (Expancel Inc. Duluth Ga.); Sil-Cell™ 35/34 a sodium potassuim aluminum silicate particles (Silbrico Corporation, Hodgkins Ill.); Dualite™ 27 Polyvinylidene chloride copolymer coated with CaCO3 (Pierce and Stevens Corporation, Buffalo N.Y.); Fillitte™ 150 ceramic spherical Trelleborg Fillite Inc., Norcross Ga.); Microbeads™ 4A soda lime partilces (Cataphote Inc., Jackson Miss.); Sphericell™ hollow glass particles (Potter Industries Inc. Valley Forge Pa.); Eccosphere™ hollow glass spheres (New Metals & Chemicals Ltd.; Essex England); Z-light™ Sphere W-1200 Ceramic hollow spheres (3M Company, St. Paul Minn.); Scotchlite™ K46 glass bubbles (3M Company, St. Paul Minn.); Vistamer™ UH 1500 and Vistamer™ HD 1800 polyethylene particles (Fluoro-Seal Inc., Houston Tex.).

The glass transition temperature of the bimodal copolymer is preferably from −20° C. to 60° C., more preferably from −15° C. to 35° C., most preferably from 5° C. to 25° C., as calculated using the Fox equation (T. G. Fox, Bull. Am. Physics Soc., Volume 1, Issue No. 3, page 123 (1956)). That is, for calculating the Tg of a copolymer of monomers M1 and M2, $$1/Tg(calc.) = w(M1)/Tg(M1) + w(M2)/Tg(M2),$$

wherein

Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1

Tg(M2) is the glass transition temperature of the homopolymer of M2, all temperatures being in ° K.

According to certain embodiments of the invention, one method of preparing the bimodal copolymer is by blending together two unimodal polymers having appropriate particle diameters. Preferably, the bimodal copolymer of the invention is prepared by a one-pot process. By "one-pot process" herein is meant that both modes of the invention are synthesized during the same process, whether that process be batch, semi-continuous, or continuous. Bimodals synthesized by a one-pot process typically show more stain blocking effectiveness then blended bimodals. The polymerization techniques used to prepare bimodal aqueous emulsion-copolymers are well known in the art. In the emulsion polymerization process conventional surfactants are utilizable. Such surfactants include, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactant used is usually from 0.1% to 6% by weight, based on the weight of monomer. Alternatively, thermal or redox initiation processes are used. Use of a redox initiation process is preferred. The reaction temperature is typically maintained at a temperature lower than 100° C. throughout the course of the reaction. Preferred is a reaction temperature between 30° C. and 95° C., more preferably between 50° C. and 90° C. The monomer mixture is alternatively added neat or as an emulsion in water. The monomer mixture from the first mode is added in one or more additions or continuously, linearly or not, over the reaction period, or combinations thereof. The growth of the second mode is initiated by use of a surfactant, or by use of a polymer seed, as taught, for example, in U.S. Pat. No. 5,726,259. By "polymer seed", herein is meant a polymer composition whose particle size predefines the diameter of the second polymer mode.

In another aspect of the present invention at least one of the modes is prepared by a multistage process in which at least two stages differing in composition are polymerized in sequential fashion. Such a process usually results in the formation of at least two mutually incompatible polymer compositions, thereby resulting in the formation of at least two phases within the polymer particles of the mode. Such particles are composed of two or more phases of various geometries such as, for example, core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase. Each of the stages of the multi-staged polymer mode may contain the same monomers, surfactants, chain transfer agents, etc. as disclosed herein for the bimodal copolymer. The polymerization techniques used to prepare such multi-stage emulsion polymers are well known in the art such as, for example, U.S. Pat. Nos. 4,325,856; 4,654,397; and 4,814,373.

In certain embodiments of the invention, conventional free radical initiators are used, such as, for example, hydrogen peroxide, sodium peroxide, potassium peroxide, t-butyl hydroperoxide, t-amyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of from 0.1% to 3% by weight, based on the weight of total monomer. In certain embodiments, redox systems using the same initiators coupled with a suitable reductant, such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite and amines such as ethanolamine, glycolic acid, glyoxylic acid hydrate, lactic acid, glyceric acid, malic acid, tartaric acid and salts of the preceding acids are used. Redox reaction catalyzing metal salts of iron, copper, manganese, silver, platinum, vanadium, nickel, chromium, palladium, and cobalt are also alternatively used.

In certain embodiments, chain transfer agents such as, for example, halogen compounds such as tetrabromomethane; allyl compounds; or mercaptans such as alkyl thioglycolates, alkyl mercaptoalkanoates, and $C_4$–$C_{22}$ linear or branched alkyl mercaptans are used to lower the molecular weight of the emulsion polymer and/or to provide a different molecular weight distribution than would otherwise have been obtained with any free-radical-generating initiator(s). Linear or branched $C_4$–$C_{22}$ alkyl mercaptans such as n-dodecyl mercaptan and t-dodecyl mercaptan are preferred. Chain transfer agent(s) are added in one or more additions or continuously, linearly or not, over most or all of the entire reaction period, or during limited portion(s) of the reaction period such as, for example, in the kettle charge and in the reduction of residual monomer stage. Preferred is the use of from 0 wt % to 5 wt %, more preferred from 0 wt % to 1 wt %, and most preferred from 0 wt % to 0.5 wt % chain transfer agent, based on the total weight of monomer used to form the aqueous emulsion copolymer. To form the aqueous emulsion copolymer, it is effective to provide a GPC (gel permeation chromatography) weight average molecular weight of 1000 to 5,000,000.

The aqueous coating composition of the invention is prepared by techniques which are well known in the coatings art. According to one technique, for example, at least one dispersed pigment is first provided. The pigment(s) is dispersed in an aqueous medium under high shear, such as is afforded by a COWLES mixer or, alternatively, at least one predispersed pigment is used. Then the aqueous emulsion bimodal copolymer (bimodal blend or one-pot synthesized bimodal) is added under low shear stirring along with other coatings adjuvants as desired. Alternatively, the bimodal aqueous emulsion copolymer is included in the pigment dispersion step. In certain embodiments, the aqueous composition contains one or more conventional coatings adjuvants such as, for example, tackifiers, emulsifiers, buffers, neutralizers, thickeners or rheology modifiers, humectants, wetting agents, biocides, plasticizers, antifoaming agents, colorants, waxes, anti-oxidants, and coalescing agents. The composition of this invention is particularly useful in paints made with less than 1% coalescing agents, such as Texanol™, based on total paint weight.

The solids content of the aqueous coating composition of the invention is from 10% to 70% by volume. The viscosity of the aqueous composition is from 50 cps to 10,000 cps, as measured using a Brookfield viscometer. There is a wide range of appropriate viscosity depending on the intended use of the aqueous composition.

The aqueous coating composition of the invention is contemplated to encompass coating or paint compositions which are described in the art as clear coatings, flat coatings, satin coatings, semi-gloss coatings, gloss coatings, priniers, textured coatings, and the like. The second aspect of the invention is a method of blocking stains by forming the aqueous stain blocking coating composition of the invention, applying that aqueous composition to a substrate, and thereupon drying, or allowing to dry that aqueous composition. As used herein, the term "substrate" includes previously coated surfaces. In certain embodiments, the composition of the invention is applied directly to the substrate without the use of a primer. Alternatively, the composition of the invention is applied to a primed substrate surface. Substrates to which the aqueous coating composition of this invention is applied include, for example, timber including but not limited to Eucalyptus Regnins (classified as Mountain Ash), Cedar (all types), Pine, Merbau, Teak, Oregon, Cypress, Meranti, Oak, Rosewood, Mahogany, Black Bean, Balsa, Kauri, Walnut, Blackwood, Myrtle, Sassafras, Blue Gum; processed timber including but not limited to mediutu density fibre board, chip board, laminates; mineral substrates including but not limited to masonry, cement, fibre cement, cement asbestos, plaster, plasterboard, glazed and unglazed ceramic; metal including but not irnited to galvanised iron, galvanised steel, cold rolled steel, Zincalum (TM), Zincalum IL (TM), Aluminium, wrought iron, drop forged steel, stainless steel; previously painted or primed surfaces (fresh, aged or weathered) including, but not limited to, acrylic coatings, vinyl acrylic coatings, styrene aciylic coatings, powder coated surfaces, solvent acrylic coatings, alkyd resin coatings, solvent urethane coatings, epoxy coatings; and synthetic substrates including, but not limited to, PVC, PVDC, polyethylene, polypropylene, on which are disposed markings deposited by aqueous or non-aqueous compositions such as those from marking pens, or which contain water soluble chromophoric staining compounds such as tannins, where such stains are capable of appearing, to a greater or lesser extent, on the surface of a dry later-deposited coating, or which contain salts which can cause efflorescence. Without being bound by mechanism, it is believed that such stains become solubilized or dispersed in wet, later-applied coating and migrate sufficiently so as to appear on the surface of a dry later-applied coating, thus defeating one of the objectives of applying the later-applied coating, namely, to hide unsightly stains. The aqueous stain-blocking coating of this invention, when dry, is believed to block and/or lock in the stains so that they cannot appear on the visible surface of a dry-later deposited coating. The aqueous stain blocking coating composition is either the sole coating applied to the stain bearing substrate, or it is followed by the application of additional coat(s) of the same composition, or a different coating composition, whether stain blocking or not. The composition of the invention is applied by conventional application methods such as, for example, brushing and spraying methods such as, for example, roll coating, doctor-blade application, printing methods, air-atomized spray, air-assisted spray, airless spray, high volume low pressure spray, and air-assisted airless spray. After application, the aqueous stain-blocking coating composition coated on the substrate is typically dried, or allowed to dry, at a temperature of from 0° C. to 200° C.

The third aspect of the invention is a method of providing improved hiding by forming the aqueous coating composition of the invention, applying that aqueous composition to a substrate, and thereupon drying, or allowing to dry that aqueous composition. By "hiding", herein is meant obscuring of the surface of the substrate (including previously coated substrates) which lies beneath the coating composition, due to the opacity of the coating. According to the method of this aspect of the invention, the aqueous coating composition of the invention is applied and dried as described above. By "improved hiding" herein is meant, hiding performance that is superior to that obtained using a polymer, including an aqueous emulsion polymer, having a composition other than that of the present invention.

Another embodiment of the invention is a method of providing improved block resistance by forming the aqueous coating composition of the invention, applying that aqueous composition to a substrate, and thereupon drying, or allowing to dry that aqueous composition. By "block resistance", herein is meant resistance against the tendency of the coating to stick or fuse to itself when two coated surfaces are placed face-to-face. By "improved block resistance" herein is meant, block resistance performance that is superior to that obtained using a polymer, including an aqueous emulsion polymer, having a composition other than that of the present invention. The aqueous coating composition of the invention may be applied and dried as described above.

An additional embodiment of the invention is a method of providing improved shear stability by forming the aqueous coating composition of the invention. By "shear stability" herein is meant resistance against changes in physical property upon subjection to conditions of shear, such as, for example, stirring or pumping. By "improved shear stability" herein is meant, shear stability performance that is superior to that obtained using a polymer, including an aqueous emulsion polymer, having a composition other than that of the present invention.

The following examples are presented to illustrate the invention and the results obtained by the test procedures.

Application Test Procedures

Tannin Stain Blocking

Cedar and Redwood panels were used in this test due to the high degree of tannins and other chromophoric extractives that are prevalent in these wood based substrates. The boards that were chosen were planed and sanded panels with a consistent grain pattern across the length of the board to avoid variability in the test. Each test panel was divided into equal sections and test samples were applied as a base coat by brush to equal spread rate which was determined by the weighing of the paint (~11 square meter per liter (~450 square feet per gallon)). Paints were allowed to dry approximately 2 hours. The test samples were then applied a second time as a top coat in the same manner as the base coat. The boards were immediately placed into a sealable, 100% humidity chamber. One half hour before placing the boards into the chamber, the chamber was prepared by placing 3 gallons of hot tap water (35°-45° C.) into it to create humidity. The boards were supported 7.6 cm (3 inches) above the water, face-up and allowed to remain there for 16 hours. The boards were then removed and allowed to dry at lab conditions for at least 24 hours.

The panels were then rated for stain blocking in two ways:
1) Qualitatively or visually, on a scale of 1 to 10 with a 10 rating being 100% tannin blocking and a 1 rating being 10% tannin blocking. In this method, 1 unit is considered significant.
2) Spectrophotometrically, by taking L*a*b readings using a Byk-Gardner Color Sphere. The b values are most important. Less-positive b values indicate better tannin stain blocking performance. L values, measuring whiteness, are also important. Higher or more positive L values indicate better tannin stain blocking performance. In this method 0.5 unit is considered significant for b and L values.

Peel Block Resistance

All steps were carried out in a constant temperature room (CTR) at 25° C. and 50% relative humidity. The test samples were cast on Leneta Form WB, a sealed white chart using a 3 Mil Bird applicator. The charts were then conditioned in the CTR for 7 days. Four 3.8 cm×3.8 cm (1½"×1½") sections (to run duplicates) from the white area of each conditioned panel were cut out. The paint surfaces of the cut sections were placed face to face. These face to face specimens were next placed in a 50° C. oven on a flat metal plate. Each individual specimen was then topped with a heated, solid, number 8 rubber stopper where a heated 1 kg weight was then placed on each stopper. In order to avoid temperature gradients which may affect the accuracy of the procedure, the weights and stoppers were equilibrated in the oven overnight prior to the running of the test. After exactly 30 minutes, the stoppers and weights were removed and the test specimens were cooled for 30 minutes at room temperature. After cooling, the specimens were pulled apart with a slow and steady force at an angle of approximately 180°. The samples were rated for block resistance on a scale of 0 to 10 where 10 equals no tack and 0 is a complete seal.

For room temperature peel block resistance, the samples were prepared according to the procedures outlined above, but they were not placed in the oven. Instead, the specimens were placed on a bench top in the CTR under No. 8 stoppers and 1 kg weights. They remained under pressure at ambient temperature for 20 hours, and their block was rated at the end of this time period.

EXAMPLES 1–2

Synthesis of Unimodal Polymer Dispersion

A unimodal polymer dispersion was prepared as follows. A 5-liter, four necked round bottom flask was equipped with paddle stirrer, thermometer, nitrogen inlet and condenser. In the initial kettle charge, a mixture of Surfactant A, ammonium bicarbonate, and deionized water was added to the kettle and heated to 82° C. under a nitrogen atmosphere. A monomer emulsion (ME) was prepared by mixing deionized water, sodium laurylether sulfate, butyl acrylate, methyl methacrylate, 1-dodecanethiol, and phosphoethyl methacrylate (61 weight % active strong acid monomer). With the kettle water at 82° C., the following materials were added in order: ME and rinse water, a mixture of 0.1% iron sulfate solution and 1% versene solution, a solution of tert-butyl hydroperoxide in deionized water, and a solution of isoascorbic acid in water. The reaction temperature was kept at 80° C. After stirring for 5 minutes, the remaining ME was added over a period of 120 minutes at 80° C. Two cofeed solutions (70% tert-butyl hydroperoxide in deionized water and isoascorbic acid in deionized water) were gradually added. When half of the ME was added to the kettle, ammonium hydroxide (28%) was added to the isoascorbic acid cofeed solution. After the completion of the monomer addition, the ME container was rinsed with deionized water. The dispersion was then cooled 60° C. While the reaction mixture was allowed to continue to cool, two chase solutions (70% tert-butyl hydroperoxide in deionized water and isoascorbic acid in deionized water) were then added over 20 minutes. A 28% ammonium hydroxide solution was added to the kettle, after which the dispersion was filtered to remove any coagulum. The quantities of all materials charged to the kettle can be found in Table 1 below.

TABLE 1

Examples 1–2: Synthesis of Unimodal Polymer Dispersion

| Material Name | Material Amount (g) | |
|---|---|---|
| | Example 1 | Example 2 |
| Initial Kettle Charge | | |
| Surfactant A | 96.8 | 16.1 |
| Ammonium bicarbonate | 6.6 | 6.6 |
| Deionized water | 1400 | 1000 |

TABLE 1-continued

Examples 1–2: Synthesis of Unimodal Polymer Dispersion

| Material Name | Material Amount (g) Example 1 | Example 2 |
|---|---|---|
| Monomer Emulsion Preparation | | |
| Deionized water | 680 | 680 |
| Sodium laurylether sulfate | 64.5 | 51.6 |
| Butyl acrylate | 940 | 940 |
| Methyl methacrylate | 996 | 996 |
| 1-Dodecanethiol | 5 | 5 |
| Phosphoethyl methacrylate (61 wt % active strong acid monomer) | 64 | 64 |
| Kettle Addition at 82 C. | | |
| Monomer emulsion | 137.5 | 136.8 |
| Rinse water | 20 | 20 |
| Mixture 0.1% iron sulfate solution/ 1% versene solution | 25/1.7 | 25/1.7 |
| 70% Tert-butyl hydroperoxide in deionized water (TBH/DIW) | 0.5/10 | 0.5/10 |
| Isoascorbic acid in deionized water (IA/DIW) | 0.25/10 | 0.25/10 |
| Kettle Addition at 80 C. | | |
| Monomer emulsion | 2616 | 2604 |
| 70% Tert-butyl hydroperoxide in deionized water (TBH/DIW) | 3.9/99 | 3.9/99 |
| Isoascorbic acid in deionized water (IA/DIW) | 2.6/90 | 2.6/90 |
| Ammonium hydroxide | 10.9 | 10.9 |
| Deionized water rinse | 30 | 30 |
| Chase Solutions | | |
| 70% Tert-butyl hydroperoxide in deionized water (TBH/DIW) | 0.82/10 | 0.82/10 |
| Isoascorbic acid in deionized water (IA/DIW) | 0.54/15 | 0.54/15 |
| 28% Ammonium hydroxide solution | 18.8 | 18.8 |
| Filtered dispersion pH | 7.6 | 7.9 |
| Filtered dispersion solids content | 44.7% | 49.3% |
| Filtered dispersion average particle size | 60 nm | 97 nm |

NOTE:
Surfactant A is a 31% solution in water of sodium ethoxylated $C_6$–$C_{18}$ alkyl ether sulfate, having 1–40 ethylene oxide per molecule.

EXAMPLE 3

Synthesis of Unimodal Aqueous Emulsion Copolymer

A unimodal polymer dispersion was prepared as follows. A 5-liter, four necked round bottom flask was equipped with paddle stirrer, thermometer, nitrogen inlet and condenser. In the initial kettle charge, a mixture of ammonium bicarbonate, the dispersion made in Example 1, and deionized water, was added to the kettle and heated to 80° C. under a nitrogen atmosphere. A monomer emulsion (ME) was prepared by mixing deionized water, Surfactant A, butyl acrylate, methyl methacrylate, 1-dodecanethiol, and phosphoethyl methacrylate (61 weight % active strong acid monomer). With the kettle water at 80° C., the following materials were added in order: ME and rinse water, a mixture of 0.1% iron sulfate solution and 1% versene solution, a solution of tert-butyl hydroperoxide in deionized water, and a solution of isoascorbic acid in water. The ME was then added over a period of 120 minutes at 80° C. Two cofeed solutions (70% tert-butyl hydroperoxide in deionized water and isoascorbic acid in deionized water) were gradually added. When half of the ME was added to the kettle, ammonium hydroxide (28%) was added to the isoascorbic acid cofeed solution. After the completion of the monomer addition, the ME container was rinsed with deionized water. The dispersion was then cooled 60° C. While the reaction mixture was allowed to continue to cool, two chase solutions (70% tert-butyl hydroperoxide in deionized water and isoascorbic acid in deionized water) were then added over 20 minutes. A 28% ammonium hydroxide solution was added to the kettle, after which the dispersion was filtered to remove any coagulum. The quantities of all materials charged to the kettle can be found in Table 2 below.

TABLE 2

Example 3: Synthesis of Unimodal Aqueous Emulsion Copolymer

| Material Name | Material Amount (g) Example 3 |
|---|---|
| Initial Kettle Charge | |
| Ammonium bicarbonate | 4.9 |
| Example 1 polymer dispersion | 76.8 |
| Deionized water | 900 |
| Monomer Emulsion Preparation | |
| Deionized water | 680 |
| Surfactant A | 25.8 |
| Butyl acrylate | 940 |
| Methyl methacrylate | 996 |
| 1-Dodecanethiol | 5 |
| Phosphoethyl methacrylate (61 wt % active strong acid monomer) | 64 |
| Kettle Addition at 80 C. | |
| Mixture: 0.1% iron sulfate solution/1% versene solution | 25/1.7 |
| 70% Tert-butyl hydroperoxide in deionized water (TBH/DIW) | 0.5/10 |
| Isoascorbic acid in deionized water (IA/DIW) | 0.25/10 |
| Monomer emulsion | 2712 |
| Cofeed Solutions | |
| 70% Tert-butyl hydroperoxide in deionized water (TBH/DIW) | 3.9/99 |
| Isoascorbic acid in deionized water (IA/DIW) | 2.6/90 |
| Ammonium hydroxide | 10.9 |
| Deionized water rinse | 30 |
| Chase Solutions | |
| 70% Tert-butyl hydroperoxide in deionized water (TBH/DIW) | 0.82/10 |
| Isoascorbic acid in deionized water (IA/DIW) | 0.54/15 |
| 28% Ammonium hydroxide solution | 18.8 |
| Filtered dispersion pH | 8.0 |
| Filtered dispersion solids content | 50.9% |
| Filtered dispersion average particle size | 226 nm |

NOTE:
Surfactant A is a 31% solution in water of sodium ethoxylated $C_6$–$C_{18}$ alkyl ether sulfate, having 1–40 ethylene oxide per molecule.

EXAMPLE 4

One-Pot Synthesis of Bimodal Aqueous Emulsion Copolymer

A bimodal polymer dispersion was prepared as follows. A 5-liter, four necked round bottom flask was equipped with paddle stirrer, thermometer, nitrogen inlet and condenser. A mixture of 29.0 grams of Surfactant A, 6.6 grams of ammonium bicarbonate, 88.9 grams of an acrylic polymer emulsion (100 nm, 45% solids), and 700 grams of deionized water was added to the kettle and heated to 80° C. under a nitrogen atmosphere. A monomer emulsion (ME) was prepared by mixing 680 grams of deionized water, 64.5 grams of Surfactant A, 940 grams of butyl acrylate, 976 grams of methyl methacrylate, 5 grams of 1-dodecanethiol, and 64 grams of phosphoethyl methacrylate (61 wt % active strong acid monomer), and 40 grams of 50% ureido methacrylate. With the kettle water at 80° C., the following materials were added in order: a mixture of 25 grams of 0.1% iron sulfate solution and 1.7 grams of 1% versene solution, a solution of 0.50 grams of tert-butyl hydroperoxide in 10 grams of deionized water, and a solution of 0.25 grams of isoascorbic acid in 10 grams of water. The ME was added to the kettle at 80° C. Two cofeed solutions (3.9 grams of 70% tert-butyl hydroperoxide in 99 grams of deionized water and 2.6 grams of isoascorbic acid in 90 grams of deionized water) were gradually added along with the monomer emulsion addition. When half of the ME was added to the kettle, ammonium hydroxide (28%, 10.9 grams) was added to the isoascorbic acid cofeed solution. After the completion of the monomer addition, the ME container was rinsed with 30.0 grams of deionized water. A solution of 0.27 grams of 70% tert-butyl hydroperoxide in 5 grams of water was added, followed by a solution of 0.17 grams of isoascorbic acid in 5 grams of water. The dispersion was then cooled 60° C. While the reaction mixture was allowed to continue to cool, two chase solutions (0.82 grams of 70% tert-butyl hydroperoxide in 10 grams of deionized water and 0.54 grams of isoascorbic acid in 15 grams of deionized water) were then added over 15 minutes. After the addition of a solution of 18.8 grams of 28% ammonium hydroxide in 20 grams of deionized water, the dispersion was filtered to remove any coagulum. The filtered dispersion had a pH of 8.1, and 52.7% of solids content. Examination of the dispersion with CHDF showed that it has two distinctive modes (55% at 90 nm and 45% at 206 nm by weight).

The unimodal polymer dispersions of Examples 2 and 3 were blended together, creating a bimodal polymer dispersion. Examples 5–8 in Table 3 show the various blend ratios used. One-pot synthesized versions of the Example 7 bimodal polymer dispersion were made according to the process of Example 4. Examples 9–10 in Table 3 thus represent one-pot synthesized bimodal polymer dispersions.

TABLE 3

Blended Bimodals and One-Pot Synthesized Bimodals

| Example | Blend Ratios |
| --- | --- |
| 5 | 20% Example 2//80% Example 3 |
| 6 | 40% Example 2//60% Example 3 |
| 7 | 60% Example 2//40% Example 3 |
| 8 | 80% Example 2//20% Example 3 |
| 9 | One-pot synthesized version of Example 7 |
| 10 | One-pot synthesized version of Example 7 |

EXAMPLE 11

Preparation of Aqueous Compositions for Peel Block Resistance and Tannin Stain Blocking Testing Aqueous coating compositions were prepared using the polymer according to the following formulation. Grind: All liquid ingredients were placed in a vessel except for the ammonia. The vessel was then placed on a benchtop mixer where the ammonia was slowly stirred in to neutralize. The contents were transferred to a COWLES high speed disperser. While the disperser was operating at low speed (1000 rpms) the dry ingredients were added in the following order; Tiona™ RCL-575 and Zinc Oxide White Seal™. Letdown: The grind was diluted with half of the letdown water and then added to the polymer dispersion on a benchtop mixer. This was followed by the addition of propylene glycol, Foamaster™ VL, water, Natrosol™ Plus 330, Texanol™, Acrysol™ RM-2020 NPR, and AcrySol™ RM-8W.

TABLE 4

Formulation Ingredients Used in Aqueous Coating Composition

| Material Name | Grams |
| --- | --- |
| Grind | |
| Propylene Glycol | 22.45 |
| Water | 13.47 |
| Tamol ™ 731A | 4.34 |
| Ammonia (28%) | 0.5 |
| Tergitol ™ NP-40 | 0.5 |
| Foamaster ™ VL | 0.5 |
| Tiona ™ RCL-575 | 142.2 |
| ZnO White Seal ™ | 4.49 |
| LetDown | |
| Propylene Glycol | 4.99 |
| Bimodal polymer | 340 |
| Foamaster ™ VL | 0.5 |
| Water | 80.66 |
| Natrosol ™ Plus 330 | 0.5 |
| Texanol ™ | 10.29 |
| Acrysol ™ RM-2020 NPR | 3.78 |
| Acrysol ™ RM-8W | 1.26 |

NOTE:
ACRYSOL and TAMOL are trademarks of Rohm and Haas Company, located in Philadelphia, Pennsylvania.
TEXANOL is a trademark of Eastman Chemical Co., located in Kingsport, Tennessee.
Tiona is a trademark of Millennium Inorganic Chemicals, located in Hunt Valley, Maryland.
NATROSOL is a trademark of Aqualon Div., Hercules Inc., located in Wilmington, Delaware.
TERGITOL is a trademark of Dow Chemicals, located in Midland, Michigan.
FOAMASTER is a trademark of Cognis, located in Cincinnati, Ohio.

Evaluation of Aqueous Compositions for Peel Block Resistance and Tannin Stain Blocking Coated samples were evaluated according to the Tannin Stain Blocking Test described above. The results are presented in Tables 5–7.

TABLE 5

Evaluation of Dry Aqueous Coating Compositions For Tannin Stain Blocking Over Cedar.

| Example | L* | b* | Visual |
| --- | --- | --- | --- |
| C2 | 96.0784 | 1.8418 | 8.5 |
| C3 | 95.8542 | 4.8267 | 6 |
| 5 | 96.0725 | 4.552 | 7 |
| 6 | 95.8937 | 3.046 | 8 |
| 7 | 96.0468 | 3.784 | 8 |
| 8 | 96.1684 | 3.5822 | 6.5 |
| 9 | 96.492 | 1.1577 | 9.5 |

TABLE 6

Evaluation of Dry Aqueous Coating Compositions For Tannin Stain Blocking Over Redwood.

| Example | L* | b* | Visual |
| --- | --- | --- | --- |
| C2 | 95.3394 | 4.607 | 6.5 |
| C3 | 91.2587 | 8.494 | 6 |
| 5 | 91.5077 | 6.181 | 5.5 |
| 6 | 94.4607 | 6.859 | 6.5 |
| 7 | 93.7909 | 6.401 | 6.5 |
| 8 | 92.4498 | 7.464 | 5.5 |
| 9 | 95.7894 | 2.6117 | 8.5 |

NOTE: Examples C2 and C3 mean Examples 2 and 3 respectively, presented as comparative examples.

The results show that blends containing 40 or 60% of small mode (Example 6 and 7 of this invention) demonstrate similar tannin stain blocking performance to that of the small particle size unimodal emulsion (Example C2). Also, when a one-pot synthesized version of the Example 7 blend was evaluated in a different series (Example 9 of this invention) the performance was superior to this blend as well as the unimodal emulsion (Example C2).

TABLE 7

Evaluation Of Dry Aqueous Coating Compositions For Peel Block Resistance.

| Examples | RT Peel Block Resistance | 50° C. Peel Block Resistance |
|---|---|---|
| C2 | 8.5 | 8 |
| C3 | 5.5 | 2 |
| 5 | 8 | 3 |
| 6 | 9 | 8 |
| 7 | 9 | 8.5 |
| 8 | 8 | 7 |
| 10 | 9 | 8.5 |

The results show that blends containing 40 or 60% of small mode (Examples 6 and 7 of this invention) demonstrate similar peel blocking performance to that of the small particle size unimodal emulsion (Example C2). Also, when a one-pot synthesized version of the Example 7 blend was evaluated in a different series (Example 10 of this invention) the performance was superior to this blend as well as the unimodal emulsion (Example C2).

Shear Stability Testing

The cone and plate of the ICI Cone and Plate Viscometer were first cleaned. The cone was then lowered by means of a lever arm until it stayed in contact with the plate At least 5 minutes of warm-up time was allowed before testing. The cone was then raised and 3 or 4 drops of sample were applied to the center of the plate. The cone was then lowered. After waiting 15–30 seconds, the start button was pressed and the reading of the indicated viscosity was noted as soon as the pointer came to rest. The process was repeated with a second specimen.

TABLE 8

Shear Stability Testing Results

| Example | Viscosity (Poises) |
|---|---|
| C2 | 0.2–1.7 |
| 10 | 0.4 |

The pointer fluctuated back and forth, never coming to rest with the unimodal Example C2 thus indicating high shear instability of this example while Example 10 of this invention demonstrated good stability.

Hiding Determination Method

The paint to be analyzed was made using the formulation outlined below (Table 9) which was prepared using the procedure of Example 11.

TABLE 9

Formulation Ingredients Used in Aqueous Coating Composition

| Material Name | Grams |
|---|---|
| Grind | |
| Propylene Glycol | 5.62 |
| Water | 3.37 |

TABLE 9-continued

Formulation Ingredients Used in Aqueous Coating Composition

| Material Name | Grams |
|---|---|
| Tamol ™ 731A | 1.09 |
| Ammonia (28%) | 0.12 |
| Teric ™ N-40 | 0.12 |
| Foamaster ™ VL | 0.12 |
| Tiona ™ RCL-575 | 36.05 |
| LetDown | |
| Propylene Glycol | 1.26 |
| Example 4 or Example C12 | 89.39 |
| Foamaster ™ VL | 0.13 |
| Supronil ™ HK | 0.26 |
| Water | 15.52 |
| Texanol ™ | 2.61 |
| Acrysol ™ RM-2020 NPR | 1.26 |
| Acrysol ™ RM-8W | 0.63 |

NOTE:
SUPRONIL is a trademark of Ciba-Geigy Corporation, located in Hawthorne, NY.
Example C12 is RHA ™ -184, which is a butylacrylate/methylmethacrylate/acrylic acid unimodal polymer dispersion supplied by Rohm and Haas Co., located in Philadelphia, Pa.

Four additional paints were made, in which the pigment volume concentration (PVC) was 80%, 60%, 40%, 20% of the initial value, holding the PVCs of all other pigments, extenders, and dyes constant. Also the volume solids of the paints was kept constant.

Films were cast with a Bird bar on Leneta™ Chart 5C. The films were allowed to dry at 20° C. and 20% relative huidity for at least 12 hrs. Y-reflectance of the coating was measured over the black and white sections of the chart using a Pacific Scientific Colorguard calorimeter (Gardner Ineotec). The gap on the Bird bar was wide enough that the dried film thickness was large enough that the Y-reflectance measured over the black and white sections of the chart were the same. S values were calculated using the following equation: $S = 2.578 \cdot Y/(1-Y)^2$, where Y is a number from 0–1. S vs pigment PVC (V) data was fit to the following equation: $S = A \cdot V \cdot (1 - B \cdot V^{1/3})$.

If the paints had Y-reflectance values of greater than 0.75, the paints were first tinted by adding 1.75 lbs of Supronil™ HK Black Liquid per 100 gals of paint before drawing down.

Values of high B value indicate that the hiding pigment (TiO$_2$) is poorly dispersed, and thus yields poor hiding. Changes of 0.02 in B are very significant.

Following the procedure above, the B values were determined for paints made from bimodal polymer dispersion Example 4, and a comparative Example C12
The results are given in Table 9 below

TABLE 9

Hiding Testing Results

| Polymer Dispersion | B Value |
|---|---|
| Example 4 | 0.225 +/− 0.013 |
| Example C12 | 0.296 +/− 0.002 |

The date clearly shows that the polymer dispersion of Example 4 has substantially better hiding (lower B) than the comparative polymer dispersion of Example C12.

What is claimed is:

1. A coating composition comprising a bimodal aqueous emulsion copolymer, wherein said bimodal copolymer comprises as polymerized units from 0.1% to 10% by weight, based on the dry weight of said copolymer, of a compound selected from the group consisting of at least one strong acid monomer, and salts thereof;

wherein said copolymer comprises small mode particles having a diameter of from 50 to 150 nm;

wherein said copolymer comprises large mode particles having a diameter of less than 400 nm, and said large mode particles are larger in diameter than said small mode particles; and wherein the ratio of said small mode particles to said large mode particles is from 10:90 to 90:10 by weight.

2. The composition, according to claim 1, wherein said strong acid monomer comprises from 0.5% to 10% by weight, of a phosphorous containing monomer.

3. The composition, according to in claim 1, wherein said ratio of said small mode particles to said large mode particles is from 30:70 to 80:20 by weight.

4. The composition, according to claim 1, wherein said copolymer is prepared by a one-pot process.

5. The composition, according to claim 1, wherein at least one mode of said copolymer is prepared by a multi-stage process.

6. The composition, according to claim 1, wherein said composition further comprises a pigment, wherein said pigment comprises at least one multivalent metal ion.

7. A method for blocking stains on a substrate comprising:
 (a) forming a coating composition comprising a bimodal aqueous emulsion copolymer,
  wherein said copolymer comprises as polymerized units from 0.1% to 10% by weight, based on the dry weight of said copolymer, of a compound selected from the group consisting of at least one strong acid monomer, and salts thereof;
  wherein said copolymer contains small mode particles having a diameter of from 50 to 150 nm;
  wherein said copolymer contains large mode particles having a diameter of less than 400 nm, and said large mode particles are larger in diameter than said small mode particles;
  wherein the ratio of said small mode particles to said large mode particles is from 10:90 to 90:10;
 (b) applying said coating composition to a substrate; and
 (c) drying, or allowing to dry said coating composition.

8. A method for providing improved hiding comprising:
 (a) forming a coating composition comprising a bimodal aqueous emulsion copolymer,
  wherein said copolymer comprises as polymerized units from 0.1% to 10% by weight, based on the dry weight of said copolymer of a compound selected from the group consisting of at least one strong acid monomer, and salts thereof;
  wherein said copolymer contains small mode particles having a diameter of from 50 to 150 nm;
  wherein said copolymer contains large mode particles having a diameter of less than 400 nm, and said large mode particles are larger in diameter than said small mode particles;
  wherein the ratio of said small mode particles to said large mode particles is from 10:90 to 90:10;
 (b) applying said coating composition to a substrate; and
 (c) drying, or allowing to dry said coating composition.

9. A method for providing improved block resistance comprising:
 (a) forming a coating composition comprising a bimodal aqueous emulsion copolymer,
  wherein said copolymer comprises as polymerized units from 0.1% to 10% by weight, based on the dry weight of said copolymer, of a compound selected from the group consisting of at least one strong acid monomer, and salts thereof;
  wherein said copolymer contains small mode particles having a diameter of from 50 to 150 nm,
  wherein said copolymer contains large mode particles having a diameter of less than 400 nm, and said large mode particles are larger in diameter than said small mode particles;
  wherein the ratio of said small mode particles to said large mode particles is from 10:90 to 90:10;
 (b) applying said coating composition to a substrate; and
 (c) drying, or allowing to dry said coating composition.

10. A method for providing improved shear stability comprising, forming a coating composition comprising a bimodal aqueous emulsion copolymer,
 wherein said copolymer comprises as polymerized units from 0.1% to 10% by weight, based on the dry weight of said copolymer, of a compound selected from the group consisting of at least one strong acid monomer, and salts thereof;
 wherein said copolymer contains small mode particles having a diameter of from 50 to 150 nm;
 wherein said copolymer contains large mode particles having a diameter of less than 400 nm, and said large mode particles are larger in diameter than said small mode particles; and
 wherein the ratio of said small mode particles to said large mode particles is from 10:90 to 90:10.

* * * * *